United States Patent Office 2,779,468
Patented Jan. 29, 1957

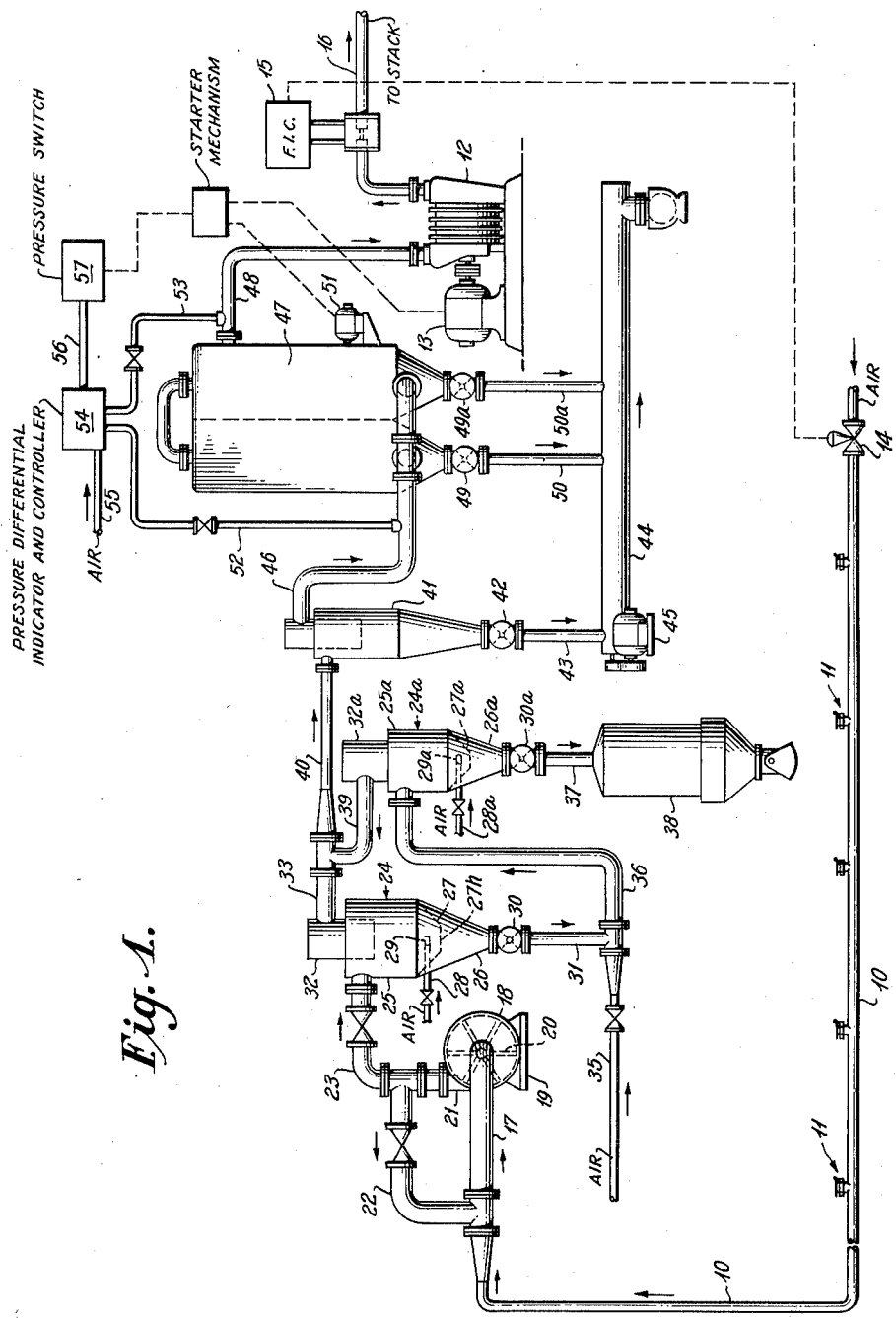

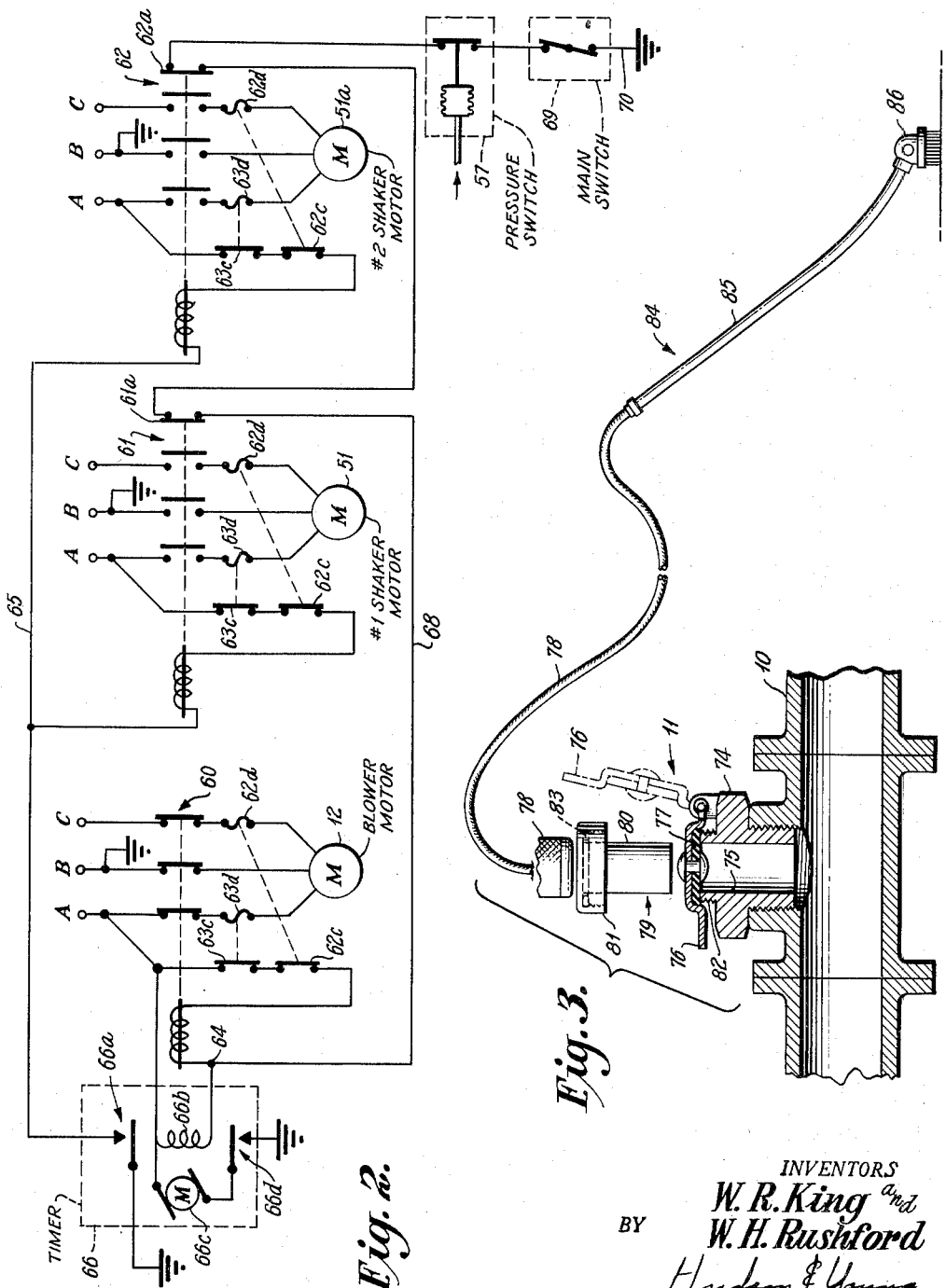

2,779,468
RECOVERY AND CLASSIFICATION OF SOLIDS

William R. King, Bartlesville, Okla., and Wilson H. Rushford, Borger, Tex., assignors to Phillips Petroleum Company, a corporation of Delaware Application February 16, 1953, Serial No. 337,198

18 Claims. (Cl. 209—144)

This invention relates to a system of classifying particles, particularly particles suspended in a gaseous medium, whereby heavier or larger particles are separated from lighter or smaller ones. In another aspect, it is relates to a system for the separation of grit particles from carbon black particles, either as a step in the process of manufacturing carbon black, or as a step in recovering loose black accumulated on the ground or floor in the region of a carbon black plant. In still another aspect, it relates to a system for providing automatic operation of a bag filter to the end that the shaker mechanism of the bag filter is automatically actuated when the pressure differential across the bag filter becomes greater than a predetermined valve. In still another aspect, it relates to an improved motor control circuit.

Theretofore, carbon black accumulating on the ground or the floor in the area of a carbon black plant has been largely wasted and, instead of being recovered, it has created a dirt problem in neighboring localities. In accordance with this invention, such black is not only picked up or removed from the floor or ground, but is actually converted into a salable product by removal of grit and other heavy particles therefrom. The black recovery system includes a bag filter in which the operation of the shaker motors is automaticaly controlled in a novel manner.

Although the invention is described herein as being applicable to such a system for the recovery of loose or spilled carbon black, the classification procedures and steps described herein have general utility, for example, in the separation of grit from carbon black in production streams, and in the classification of solids in other types of operations.

It is an object of the invention to provide an improved system for recovering loose carbon black collected on the floor or ground in the region of a carbon black storage or producing plant.

It is a further object to provide novel classification steps and apparatus for the separation of materials of varying densities, particularly when such materials are suspended in a gaseous medium.

It is a still further object to provide a circuit and system whereby a bag filter utilized to separate residual solids from a gaseous stream is automatically controlled so as to remove accumulation of material from the filters when the pressure differential in the bag filter exceeds a predetermined value.

It is a still further object to provide an improved motor control circuit.

Various other objects, advantages and features of the invention will become apparent from the following detailed description taken in conjunction with the accompanying drawings in which:

Figure 1 is a flow diagram of a carbon black recovery system constructed in accordance with this invention;

Figure 2 is a schematic circuit diagram of a system for controlling the bag filter; and Figure 3 is a vertical sectional view, partially in elevation, of one of the collecting units.

Referring now to Figure 1, I have shown a black collecting conduit 10 which extends through the region of the plant from which the carbon black is to be collected, this conduit having a plurality of fittings 11 spaced therealong which are adapted to receive a hose connection of the type illustrated in Figure 3 and described in detail hereinafter by which the black is removed from the floor or ground, the action being much the same as an ordinary vacuum cleaner. A blower 12 driven by a motor 13 draws air through the system, as will become evident, to provide suction in the conduit 10 permitting the carbon black to be drawn into the conduit through the hose attachment. Air is admitted to the conduit 10 under the control of a valve 14 which is automatically actuated by a flow indicating controller 15 in the outlet conduit 16 of the system so as to maintain a predetermined rate of flow of air through the system.

It will be understood that substantial quantities of loose and pelleted carbon black are discarded in the ordinary operation of a carbon black plant, for example, due to spillage of the black in the region of loose black conveyors and pellet mills. In order that this material may be recovered and reprocessed, nearly all foreign material, herein generically termed grit, must be removed from the black before it is reprocessed. In carbon black production, the term "grit" is taken to mean hard or cinder-like particles of greater than a predetermined size, usually 80 mesh, resulting from abrasion of steel vessels or pipes, or refractory materials in the reactors. Where the carbon black is spilled, the grit may include materials such as sand or rock, or even small metallic particles.

As the material passes through the conduit 10, it will be understood that the black particles and grit particles are suspended in the air passing through the conduit, which constitutes a gaseous suspending medium. The air stream containing the suspended particles is introduced into an inlet 17 formed upon the housing 18 of a blower 19 which is equipped with rotable blades 20. As the black passes through the housing 18, it is subjected to a hammering action by the blades 20 with the result that any pellets or large pieces of black are pulverized, and the particles leaving the housing 18 through an outlet 21 communicating therewith are of more uniform and smaller size. For best results, the blower should be operated at a relatively slow speed, for example, 2000 revolutions per minute.

In order to secure a more uniform particle size, we have found it advantageous to recycle a portion of the pulverized material through a valved line 22 from outlet conduit 21 to inlet conduit 17, the remainder of the material passing through a valved conduit 23 to the separation system. Preferably and advantageously, about three-fourths of the material leaving the blower is recycled in this manner, although the recycle rate can vary within rather wide limits and, in some cases, it is possible to operate without recycling any material.

The pulverized grit and carbon black particles suspended in air, hereafter termed carrier air, pass through the conduit 23 to an enlarged separating or classification vessel 24. This vessel includes an enlarged cylindrical upper section 25 and a frusto-conical lower section 26. A frusto-conical plate 27 protrudes downwardly into the lower section 26, this plate being perforated by a central opening 27h. An air pipe 28 has a tangential inlet 29 disposed in lower section 26 between the plate 27 and outer wall of the lower section 26 so that the air flows into the annular space between plate 27 and housing section 26, and then flows upwardly through opening 27h, to upper section 25.

In the separator 24, the heavy grit particles preferentially settle to the bottom and are removed through a star valve 30 and a pipe 31 while the lighter carbon black particles pass upwardly and are removed through a duct 32 and an outlet line 33 at the top of the vessel 24. For a given size of settling chamber, we have found that the air, hereinafter termed elutriation air, admitted through line 28 can be readily regulated so that heavy particles or particles of greater than a predetermined size (for example, 80 mesh) have a settling velocity greater than the upward velocity of the elutriation air stream. We have also found that, for a given ratio of carrier air to elutriation air, a definite percentage of black settles out downwardly with the grit while this ratio has no apparent effect upon the grit content of the recovered black. That is, the defined air ratio controls the amount of black lost with the grit stream, but has little effect upon the character of the recovered product. The particle size of the material settling to the bottom can be regulated by varying the pressure drop across the vessel in any suitable manner, for example, by changing the size of outlet duct 32.

One series of tests was made wherein cylindrical section 25 had a diameter of 24 inches with a 6 inch radial entry port for inlet 23 and a 12 inch outlet duct 32 communicating with line 33. It was found that the radial inlet substantially reduced the amount of black passing out at the bottom of the unit with the grit, as compared with the amount of black lost utilizing a tangential inlet port. This is probably due to the fact that appreciable amounts of black are lost as a result of the agglomeration effect caused by high speed rotation of the air stream in the separator vessel when a tangential port is used.

The perforated plate 27 provides an improved separation action in that black and grit particles settle out on the plate, and the smaller and lighter black particles are re-entrained by the elutriation air stream so that they are carried upwardly through the outlet duct 32 rather than eventually falling downwardly and being removed with the grit through outlet conduit 31. It was found that little difference in operation was produced by changing the elutriation air port from a tangential port to a radial port. It was also found that the black loss with the grit could be reduced by approximately ten percent when the bottom of the outlet duct 32 extended to the level of the center line of the radial entry or slightly below it, for example four inches or less, rather than nine inches or more below it. Positioning of the outlet duct in this manner had little or no effect upon the grit content of the black product.

In a typical operation, the air ratio, that is the ratio of carrier air to elutriation air, was varied from about 2 to 21, with a feed rate of six pounds of black per minute, and an elutriation air rate of 85 cubic feet per minute. In all cases, the grit content of the black removed was less than 0.01 percent, and over 99.9 percent of the grit initially present was removed. However, with an air ratio of 2.33, 20 percent of the black feed to the separator was removed with the grit while, with an air ratio of 21, about 35 percent of the black was removed with the grit, the amount of black lost being inversely proportional to the air ratio. In general, we have found that the amount of grit in the carbon black product is not substantially affected by the amount of grit present in the feed, large changes in air ratio or variations in other operating conditions.

It will be understood, therefore, that the carbon black leaving the separator through conduit 32 has approximately 99.9 percent of the grit removed therefrom, the grit content being of the order of 0.008 percent or less with an average of slightly more than 0.005 percent. However, even with an air ratio of 2, approximately 20 percent of the black fed to the separation zone is removed downwardly through line 31 along with the grit.

In accordance with the invention, a major portion of this material is recovered by suspending the grit particles along with some carbon black passing downwardly through conduit 31 in a stream of air fed through a valved line 35. The air stream containing suspended carbon black and grit particles passes through a conduit 36 to a second separator 24a of similar construction to the separator 24, corresponding parts being indicated by like reference numerals followed by the letter "a," the separator generally being operated under the same conditions as separator 24. In separator 24a, the grit particles settle to the bottom of the vessel together with a small amount of black and are removed through star valve 30a, a conduit 37 and a hopper 38, from which the grit can be periodically discarded. The carbon black particles suspended in air pass through an outlet 39 to a conduit 40 wherein they are combined with the carbon black recovered in separator 24. In this manner, the total amount of carbon black lost with the grit can be reduced to 5 percent or lower, the use of the second grit separator 24a producing about a 15 percent increase in black recovery.

The combined streams of carbon black suspended in air pass through conduit 40, and enter a cyclone separator 41 wherein the bulk of the carbon black settles downwardly and is removed through a star valve 42 and a conduit 43 communicating with a screw conveyor 44 driven by a motor 45. The conveyor 44 can pass the black to a portion of the production plant upstream of the micropulverizer, where the grit content can be further reduced. Of course, the recovered black can be passed to other disposal as desired by the conveyor 44.

Residual amounts of carbon black leave the separator 41 with the air stream, and this material passes through a conduit 46 to a bag filter 47. The filter has a gas discharge conduit 48 communicating with the suction of blower 12, and a pair of star valves 49, 49a through which the black recovered from the gaseous stream is discharged through conduits 50 and 50a, respectively to the conveyor 44. Bag filter 47 is also equipped with a pair of shaker motors, one of which is indicated by reference numeral 51, the function of these motors being, as is well understood, to vibrate the frame of the bag filter and cause the loose black accumulated upon the filter cloth to be released and fall downwardly through the star valves to the conveyor 44.

In accordance with this invention, the blower 12 operates continuously until sufficient black is accumulated upon the filter cloth of unit 47 to increase the pressure differential across the filter to greater than a predetermined value. At this time, operation of the blower 12 is terminated for a timed period, and the shaker motors are operated during this period to free the filter cloth of the accumulated black. At the end of the timed period, operation of blower 12 is resumed and, if the pressure differential is now below the predetermined value, normal operation continues. However, if the pressure differential is still too high, another cycle of operation of the shaker motors is initiated.

To this end, pressure taps are provided upon the inlet conduit 46 and outlet conduit 48 of the bag filter, these taps communicating through valved lines 52 and 53, respectively, with a pressure differential indicator and controller 54 supplied with air through a line 55. An air line 56 from controller 54 leads to a pressure switch 57 which is connected in an electrical circuit in the manner shown by Figure 2.

In this figure, the blower motor is indicated by reference numeral 12, one shaker motor is indicated by reference numeral 51 and the other shaker motor is indicated by reference numeral 51a. Preferably, the motors are of the three phase type, and each motor is connected by main conductors and main contactor relays 60, 61, and 62, respectively, to a polyphase alternating current source represented by terminals A, B, and C, the terminals B being grounded. The respective coils of each of the contactor relays 60, 61 and 62 have one terminal thereof connected to contact A through two normally closed contact sets 62c and 63c of suitable thermal overload relays.

The respective thermal elements 62d and 63d of the overload relays are connected in series with the supply lines of the respective motors leading to contacts A and C to the end that the contactor relay circuit is broken when an overload condition exists for greater than a predetermined time interval, as determined by the thermal integrating characteristics of the overload relays.

The coil of contactor relay 60 has its other terminal connected to a junction 64, while the coils of the contactor relays 61 and 62 have their other terminals connected to a common conductor 65 which, in turn, is connected to ground through a normally closed contact set 66a of a timer 66. Junction 64 is connected through a timer coil 66b to terminal A, the coil 66b operating contact set 66a and 66d, and the timer motor 66c has one terminal thereof connected to terminal A, the other timer motor terminal being connected to ground through a set 66d of normally closed timer contacts.

Junction 64 is also connected in circuit by a lead 68 with a normally closed contact set 61a of contactor relay 61, a normally closed contact set 62a of contactor relay 62, the contacts of pressure switch 57, a main switch 69 and ground at 70.

In operation, assuming that the blower motor is in operation and that no excessive pressure differential exists across the bag filter, the contacts of pressure switch 57 are closed and main switch 69 is closed with the result that a circuit is completed through the energizing coil of contactor relay 60 through contact sets 62a, 61a, the coil of the contactor relay 60 and its associated overload relay contacts 62 and 63 to terminal A, thus closing contactor relay 60 and effecting operation of blower motor 12. A parallel circuit is also completed through timer coil 66b with the result that contacts 66a, 66d are open. Accordingly, the circuits to the energizing coils of contactor relays 61 and 62 are open at contact set 66a while the circuit to the timer motor is open at contact set 66d. When the pressure differential across the bag filter builds up to greater than a predetermined value, pressure switch 57 is opened with the result that the circuit of contactor relay 60 is broken as is the circuit to coil 66b. As a result, contactor relay 60 opens, thereby stopping the blower motor 12, and coil 66b is deenergized, thereby closing contact sets 66a and 66d.

Thereupon, the circuit to the operating coils of contactor relays 61 and 62 is closed through contact set 66a and operation of the shaker motors is initiated, it being noted that energization of these relays opens contact sets 61a and 62a. The timer motor is energized by contact set 66d and a timing cycle is thereby initiated during which the shaker motors are operative.

When blower motor 12 stops, the pressure across the bag filter is, of course, immediately reduced so that pressure switch 57 again closes. However, the circuit to the coil of contactor relay 60 and timer coil 66b is now broken at contacts 61a and 62a so that the described closure of the pressure switch does not cause the blower motor to start operating. At the end of the timed period, timer 66 is reset with the result that contacts 66a and 66d are momentarily opened.

Thereupon, contactor relays 61 and 62 are deenergized with the result that the shaker motors 51 and 51a stop operating, and the circuit to the coil of contactor relay 60 and timer coil 66b is closed through closure of contact sets 61a and 62a. The energization of coil 66b maintains contact sets 66a and 66d in open position and the energization of the coil of contactor relay 60 causes the blower motor 12 to again operate.

If sufficient carbon black has been removed from the filter cloth by operation of the shaker motors, pressure switch 57 remains closed and operation of the blower continues in the normal manner. However, if the pressure differential is still greater than a predetermined value, the pressure switch is again opened when blower 12 reaches full operating speed so that another cycle of operation of the shaker motors is initiated.

It will be evident, therefore, that the circuit of Figure 2 provides for cessation of blower operation and a timed period of shaker motor operation, this cycle occurring automatically whenever the pressure differential across the bag filter becomes excessive.

In Figure 3, we have shown a typical installation for connecting a hose and pick up device to the conduit 10 through which the carbon black containing suspended grit passes into the system. It will be noted that each fitting 11, as illustrated in Figure 3 comprises a seat 74 having a tapered inner surface 75, the seat normally being closed by a pivoted cap 76 incorporating a sealing gasket 77. A rubber hose 78 is provided with a fitting 79 including a tapered portion 80 adapted to fit within and tightly engage the tapered portion 75 of seat 74 together with an internally threaded flange 81 which cooperates with a complementary screw threaded portion 82 protruding from the seat 74, a gasket 83 being provided within the section 81. The end of hose 78 remote from the fitting is secured to a pick up device 84 which may include a section 85 of pipe connected to a brush, nozzle or other suitable pick up device 86.

As previously stated, operation of the blower motor causes a stream of air to pass through the system from valve 14 through the blower 18, separators 24, 24a and 41, bag filter 47 and outlet conduits 48 and 16. This produces a suction at each of the fittings 11 and, when a pick up device is attached to one or more of these fittings, as illustrated in Figure 3, a suction is created so that carbon black particles are picked up from the floor or ground by the nozzle device 86 and transferred through the conduit 10 to the blower 19. The suspended particles are pulverized in the blower, and the grit is separated from the carbon black particles in separator 24, a major portion of the carbon black settling downwardly with the grit being recovered in secondary separating vessel 24a. The recovered black passes through cyclone separator 41, from which the major portion of the grit free black is fed to conveyor 44, the residual black entrained in the air being recovered in bag filter 47. The bag filter is provided with a system, as described, for automatic operation of the shaker motors when the pressure differential across it exceeds, a predetermined value. In this manner, black spilled upon the ground or floor is recovered and converted into a useful product by the removal of the grit.

It will be apparent, however, that many features of the invention have independent utility for other purposes than the collection of spilled black. For example, the grit removal system can be used in conjunction with normal carbon black manufacturing operations where the grit content of the manufactured black must be reduced to meet product specifications. Further, the classification system is useful in processes other than the manufacture of carbon black where a separation or classification must be effected between particles of different size or density, particularly when such particles are suspended in a gaseous medium. Finally, the electrical circuits controlling the automatic operation of the shaker motor have independent utility in operations other than the separation of residual amounts of carbon black from a gaseous stream.

In some cases, line 36, which can be a line of relatively small diameter, becomes clogged when air circulation through the system is stopped during a period of shaker motor operation. If this occurs, the motor of star valve 30, Figure 1, which has a starter system of the type illustrated in connection with motor 12, Figure 2, can have the associated operating coil connected in parallel with the operating coil of blower motor 12. As a result, when the blower stops, star valve 30 stops, and the material in vessel 24 cannot settle into conduits 31, 36 and clog them. Also the operating coils associated with star valves 49, 49a, the motors of which also have starters of the type illustrated in Figure 2, can be connected in parallel with the operating coil of one of the shaker motors 51 or 51a. Thus, star valves 49, 49a are only actuated during the period when loose black is being shaken from the bags of filter 47 by action of the shaker motors. This saves electricity, and minimizes leakage of gas from conduit 44 into the bag filter 47.

While the invention has been described in connection with a present, preferred embodiment thereof, it is to be understood that this description is illustrative only and is not intended to limit the invention.

We claim:

1. In apparatus for separating grit from carbon black, an elongated upright vessel having a cylindrical upper section and a frusto-conical lower section, a perforated plate disposed generally horizontally across said vessel at the top of said frusto-conical section, means for introducing a gaseous stream containing suspended carbon black and grit radially into said cylindrical section, means for introducing air into said frusto-conical section below said perforated plate, the dimensions of the vessel and the flow rate of gaseous suspending medium and air being regulated so that said grit particles preferentially settle to the bottom of said frusto-conical section, means for withdrawing said grit particles from the bottom of said frusto-conical section, and means for withdrawing gas containing suspended carbon black from a region of said cylindrical section at or just below the region of introduction of said gaseous stream.

2. In a system for separating relatively heavy grit particles from relatively light carbon black particles, an elongated upright vessel having an enlarged upper cylindrical section, a frusto-conical lower section, a frusto-conical plate having its enlarged end secured to the lower end of said cylindrical section and its reduced end protruding into said frusto-conical lower section, an air line extending into said frusto-conical section having its outlet positioned intermediate the walls of said frusto-conical section and said plate, means for introducing a gaseous stream containing suspended carbon black and grit particles radially into said upper section, means for introducing air into said line, the rate of flow of air and suspending medium together with the dimensions of said vessel being arranged so that said heavy grit particles perferentially settle to the bottom of said vessel, means for withdrawing settled grit particles, and means for withdrawing gas containing suspended carbon black from said cylindrical section.

3. In a process for separating relatively heavy grit particles from relatively light carbon black particles wherein said particles are suspended in a gaseous medium, the steps which comprise passing said gaseous medium into a first settling zone wherein the heavy grit particles preferentially settle to the bottom of said zone, withdrawing grit particles containing minor amounts of carbon black from the bottom of said first settling zone and passing them, while suspended in a gaseous medium, into a second settling zone wherein the residual grit particles settle downwardly and are separated from the residual carbon black particles, withdrawing carbon black particles suspended in a gaseous medium from the top of said first and second settling zones and introducing them into a third settling zone wherein a major amount of carbon black particles settles downwardly and is withdrawn from the bottom of said third settling zone, withdrawing a gaseous stream containing residual amounts of carbon black from the top of said third settling zone, and separating said residual carbon black particles from the gaseous medium in which they are suspended.

4. In a system for separating relatively heavy grit particles from relatively light carbon black particles suspended in a gaseous medium, a blower having rotatable blades disposed within a housing, an inlet and an outlet communicating with said housing, a first separating vessel, a second separating vessel, and a third separating vessel, a bag filter, means for introducing said suspending medium containing particles of carbon black and grit into said blower inlet wherein said particles are subjected to a hammering action, means for recycling a portion of the material from said outlet to said inlet, means for introducing the rest of said material into said first separating zone wherein heavy grit particles preferentially settle to the bottom of the zone, means for suspending the grit particles in a stream of air and introducing said stream into said second separating zone wherein said grit particles preferentially settle to the bottom of the zone, means for combining gas containing suspended carbon black particles from the top of said first and second separating zones, means for passing the combined streams into said third separating zone wherein the major portion of the carbon black particles settle to the bottom of the zone, means for withdrawing gas containing residual carbon black particles from the top of said third separating zone, means for passing such material through said bag filter, and means for recovering said residual carbon black particles from said bag filter.

5. In a system for separating grit from carbon black suspended in a gaseous medium, a blower having a housing, rotatable blades mounted therein, an inlet line and an outlet line communicating with said housing, means for feeding said gaseous medium containing suspended carbon black and grit into said inlet line, the carbon black and grit being subjected to a hammering action by said blades within said housing, means for withdrawing through said outlet line said gaseous medium containing carbon black and grit particles of reduced size, means for recycling a portion of the material in said outlet line to said inlet line, means for passing the rest of said material into an enlarged settling zone wherein the grit particles preferentially settle to the bottom of said zone, means for withdrawing carbon black particles suspended in a gas from said settling zone, and means for separating said carbon black particles from said gas.

6. In a system for separating relatively heavy grit particles from relatively light carbon black particles suspended in a gaseous medium, a first blower having rotatable blades disposed within a housing, an inlet and an outlet communicating with said housing, a first separating vessel, a second separating vessel, and a third separating vessel, a bag filter, means including a second blower for drawing said suspending medium containing particles of carbon black and grit into the inlet of said first blower inlet wherein said particles are subjected to a hammering action, means for recycling a portion of the material from said outlet to said inlet, means for introducing the rest of said material into said first separating zone wherein heavy grit particles preferentially settle to the bottom of the zone, means for suspending the grit particles in a stream of air and introducing said stream into said second separating zone wherein said grit particles preferentially settle to the bottom of the zone, means for combining gas containing suspended carbon black particles from the top of said first and second separating zones, means for passing the combined streams into said third separating zone wherein the major portion of the carbon black particles settle to the bottom of the zone, means for withdrawing gas containing residual carbon black particles from the top of said third separating zone, means passing such material through said bag filter, means for recovering said residual carbon black particles from said bag filter, a shaker motor cooperating with said bag filter, a second blower in the outlet line of said bag filter, said second blower providing the suction necessary for drawing the suspension of carbon black and grit into said first blower, a pressure differential control instrument responsive to the differential pressure between the inlet and outlet of said bag filter, and means responsive to the presence of greater than a predetermined pressure differential to stop operation of said blower for a time period and, during said period, to actuate the said shaker motor; the aforesaid cycles of operation resulting in a correspondingly intermittent flow of carbon black and grit into said first blower.

7. The method of separating grit from carbon black which comprises introducing a gaseous stream containing suspended carbon black and grit radially into a vertically elongated settling zone of generally cylindrical cross-section, upwardly introducing a stream of air into said settling zone through a path of restricted cross-section at such velocity as to carry upwardly the carbon black particles while permitting the heavier grit particles to settle downwardly through the ascending air stream, withdrawing carbon black substantially free from grit from the top of said settling zone, and withdrawing grit through said path of restricted cross-section from the bottom of said settling zone, said radial introduction of the gaseous stream reducing agglomeration caused by high speed rotation of the air stream in the separation zone with resultant increase in carbon black recovery.

8. The method of separating grit from carbon black which comprises introducing a gaseous stream containing suspended carbon black and grit radially into a vertically elongated settling zone of generally cylindrical cross-section, upwardly introducing a stream of air into said settling zone through a path of restricted cross-section at such velocity as to carry upwardly the carbon black particles while permitting the heavier grit particles to settle downwardly through the ascending air stream, withdrawing carbon black through a path of restricted cross-section extending downward into the separation zone at least to the level of the center line of the incoming radial gaseous stream, recovering the carbon black thus withdrawn, and downwardly withdrawing the grit through the lower path of restricted cross-section.

9. In a method of classifying solids, the steps which comprise passing a gaseous stream containing suspended relatively light particles and relatively heavy particles radially into a vertically elongated settling zone of generally cylindrical cross-section, upwardly introducing a stream of air into said settling zone through a path of restricted cross-section at such velocity as to carry upwardly the relatively light particles while permitting the relatively heavy particles to settle downwardly through the ascending air stream, withdrawing relatively light particles substantially free from relatively heavy particles from the top of said settling zone, and withdrawing relatively heavy particles through said path of restricted cross-section from the bottom of said settling zone, said radial introduction of the gaseous stream reducing agglomeration caused by high speed rotation of the air stream in the separation zone with resultant increase in light particle recovery.

10. In a method of classifying solids, the steps which comprise passing a gaseous stream containing suspended relatively light particles and relatively heavy particles radially into an upright settling zone of generally cylindrical cross-section, upwardly introducing a stream of air into said settling zone through a path of restricted cross-section at such velocity as to carry upwardly the relatively light particles while permitting the relatively heavy particles to settle downwardly through the ascending air stream, withdrawing relatively light particles through a path of restricted cross-section extending downward into the separation zone at least to the level of the center line of the incoming radial gaseous stream, recovering the relatively light particles thus withdrawn, and downwardly withdrawing the relatively heavy particles through the lower path of restricted cross-section.

11. In a system for recovering carbon black, in combination, means for establishing a flow of gas through a conduit, a line communicating with said conduit having a nozzle thereon to pick up carbon black particles from a surface and suspend them, together with grit particles, in said gas, means for feeding said stream from said conduit into an enlarged settling zone constructed and arranged so that heavy grit particles preferentially settle to the bottom of said zone, said settling zone being defined by an upright generally cylindrical vessel section, a perforated plate at the bottom of said section, and a frusto-conical section below said perforated plate, said vessel having an inlet for said gaseous suspending medium formed in said upper section, an outlet for gas containing suspended carbon black communicating with said cylindrical section, grit collecting means at the lower part of said frusto-conical portion, means for introducing air into the region of said vessel below said perforated plate, means for withdrawing carbon black relatively free from grit and suspended in a gaseous medium from said outlet, means for introducing said last-named stream into a second settling zone constructed and arranged so that the major portion of the carbon black particles collects at the bottom of said second settling zone, means for withdrawing carbon black from the bottom of said second settling zone, means for withdrawing a gaseous stream containing residual amounts of carbon black from the top of said second settling zone, and means for separating said residual carbon black particles from said last-named gaseous stream.

12. In a system for recovering carbon black, in combination, means for establishing a flow of gas through a conduit, a line communicating with said conduit having a nozzle thereon to pick up carbon black particles from a surface and suspend them, together with grit particles, in said gas, means for feeding said stream from said conduit into an enlarged settling zone constructed and arranged so that heavy grit particles preferentially settle to the bottom of said zone, said settling zone being defined by an upright generally cylindrical vessel section, a perforated plate at the bottom of said section, and a frustoconical section below said perforated plate, said vessel having an inlet for said gaseous suspending medium formed in said upper section, an outlet for gas containing suspended carbon black communicating with said cylindrical section, grit collecting means at the lower part of said frustro-conical portion, means for introducing air into the region of said vessel below said perforated plate, means for withdrawing carbon black relatively free from grit and suspended in a gaseous medium from said outlet, means for introducing said last-named stream into a cyclone separator constructed and arranged so that the major portion of the carbon black particles collects at the bottom of said cyclone separator, means for withdrawing carbon black from the bottom of said cyclone separator, means for withdrawing a gaseous stream containing residual amounts of carbon black from the top of said cyclone separator, and a bag filter connected to said cyclone separator to separate said residual carbon black particles from said last-named gaseous stream.

13. The method of recovering carbon black spilled on a surface which comprises suspending said carbon black containing grit particles in an air stream, introducing said stream into a first settling zone, introducing air upwardly into said settling zone at such velocity as to carry upwardly the carbon black particles, the grit particles settling downwardly, recovering the settled grit particles from the bottom of the settling zone, suspending said grit particles in a gaseous suspending medium, and introducing the resulting stream into a second settling zone, upwardly introducing air into said second settling zone at such velocity as to carry upwardly residual carbon black particles contained in the grit, combining the overhead streams from the two separation zones as a suspension in a gaseous medium, and passing the last-mentioned stream through a medium which is pervious to gas and impervious to solid particles thereby to separate carbon black from said last-named suspending medium.

14. In a system for recovering carbon black, the steps which comprise suspending carbon black containing grit in a gaseous suspending medium, contacting said stream with a series of rotating blades, moving said blades at sufficient speed as to hammer the grit particles and effect disintegration thereof, introducing the gaseous stream containing carbon black and disintegrated particles into an enlarged settling zone, passing a stream of air upwardly into said settling zone through a confined path at sufficient velocity as to carry upward the carbon black particles, the heavier grit particles settling downwardly through the confined air stream, and recovering the carbon black overhead from said settling zone.

15. In a system for recovering solid materials, in combination, an air line having an inlet valve therein, a plurality of ports spaced along said line, adapted to be connected to a device for collecting spilled material, a system for classifying solid materials suspended in the air connected to the outlet end of said line, a filter device connected to said separation system to separate one of the classified materials from gaseous suspending medium, a blower connected to the outlet of said filter, means for driving said blower to pull air through said line, said separation system and said filter, a flow indicating controller having a sensing element in the outlet line of said blower, said controller being operatively connected to said valve to regulate the flow of air into the system so as to maintain a constant rate of flow at the outlet of said blower.

16. In a system for recovering carbon black, in combination, an air line having an inlet valve therein, a plurality of ports spaced along said line, adapted to be connected to a device for collecting spilled carbon black, a system for separating carbon black and grit connected to the outlet end of said line, said separation system including a settling device into which the carbon black to be classified is fed suspended in the gaseous medium, means for introducing air upwardly into said settling zone at such velocity as to carry carbon black particles upwardly with resultant settling of the relatively heavy grit particles, and means for recovering the relatively light carbon black particles overhead suspended in said gaseous medium, a bag filter connected to said separation system to separate carbon black from gaseous suspending medium, a blower connected to the outlet of said bag filter, means for driving said blower to pull air through said line, said separation system and said filter, a flow indicating controller having a sensing element in the outlet line of said blower, said controller being operatively connected to said valve so as to regulate the flow of air into the system so as to maintain a constant rate of flow at the outlet of said blower.

17. The method of separating carbon black and grit which comprises introducing a gaseous stream containing suspended carbon black and grit into a settling zone, introducing a stream of air through a confined path upwardly into the settling zone at such a velocity as to carry upwardly the carbon black particles while the heavier grit particles settle downwardly through the ascending air stream, withdrawing carbon black substantially free of grit overhead from said settling zone, withdrawing grit downwardly through said path of restricted cross-section from the settling zone, and obtaining said gaseous stream containing suspended carbon black and grit by maintaining a zone of reduced pressure adjacent an area containing spilled carbon black, said zone of reduced pressure being maintained by suction caused by flowing a stream of gaseous suspending medium at high velocity adjacent said area, whereby the spilled carbon black containing grit is suspended in the gaseous medium.

18. The method of separating carbon black and grit which comprises introducing a gaseous stream containing suspended carbon black and grit into a settling zone, introducing a stream of air through a confined path upwardly into the settling zone at such a velocity as to carry upwardly the carbon black particles while the heavier grit particles settle downwardly through the ascending air stream withdrawing carbon black substantially free of grit overhead from said settling zone, withdrawing grit downwardly through said path of restricted cross-section from the settling zone, and wherein the withdrawn grit is suspended in a gaseous medium and introduced into a second settling zone, a current of air is introduced upwardly into the second settling zone through a confined path at such velocity as to carry upwardly the residual carbon black particles with downward settling of the grit particles contained in the gaseous stream, and carbon black is recovered from the top of the first and second separation zones.

References Cited in the file of this patent

UNITED STATES PATENTS

| | | |
|---|---|---|
| 566,554 | Young et al. | Aug. 25, 1896 |
| 1,099,680 | Weirich | June 9, 1914 |
| 1,317,852 | Ashenhurst | Oct. 7, 1919 |
| 1,880,907 | Duerr | Oct. 4, 1932 |
| 2,173,088 | Eissman | Sept. 19, 1939 |
| 2,276,805 | Tolman | Mar. 17, 1942 |
| 2,294,290 | Freeman | Aug. 25, 1942 |
| 2,318,395 | Hornbrook | May 4, 1943 |
| 2,415,072 | Brown | Feb. 4, 1947 |
| 2,448,038 | Lykken et al. | Aug. 31, 1948 |
| 2,460,938 | Koehne | Feb. 8, 1949 |
| 2,512,332 | Hyde | June 20, 1950 |
| 2,513,963 | Patterson | July 4, 1950 |
| 2,542,189 | Gates et al. | Feb. 20, 1951 |
| 2,548,332 | Alexander et al. | Apr. 10, 1951 |
| 2,633,206 | Bruckner | Mar. 31, 1953 |

FOREIGN PATENTS

| | | |
|---|---|---|
| 401,630 | Great Britain | Nov. 16, 1933 |